(12) United States Patent
Archambault et al.

(10) Patent No.: US 8,037,462 B2
(45) Date of Patent: Oct. 11, 2011

(54) FRAMEWORK FOR PARALLELIZING GENERAL REDUCTION

(75) Inventors: Roch G. Archambault, North York (CA); Yaoqing Gao, North York (CA); Zhixing Ren, Markham (CA); Raul E. Silvera, Woodbridge, CA (US)

(73) Assignee: International Business Machines Corporation, Armonk, NY (US)

( * ) Notice: Subject to any disclaimer, the term of this patent is extended or adjusted under 35 U.S.C. 154(b) by 1301 days.

(21) Appl. No.: 11/461,863

(22) Filed: Aug. 2, 2006

(65) Prior Publication Data

US 2008/0052689 A1 Feb. 28, 2008

(51) Int. Cl.
*G06F 9/45* (2006.01)
(52) U.S. Cl. ........ 717/149; 717/119; 717/141; 717/154; 717/159
(58) Field of Classification Search .................. None
See application file for complete search history.

(56) References Cited

U.S. PATENT DOCUMENTS

| | | | | |
|---|---|---|---|---|
| 5,790,859 | A * | 8/1998 | Sarkar | 717/130 |
| 5,937,194 | A * | 8/1999 | Sundaresan | 717/119 |
| 6,282,704 | B1 | 8/2001 | Iitsuka | |
| 7,620,945 | B1 * | 11/2009 | Song et al. | 717/149 |
| 2003/0126589 | A1 * | 7/2003 | Poulsen et al. | 717/149 |
| 2004/0117781 | A1 * | 6/2004 | Bera | 717/160 |

OTHER PUBLICATIONS

Suganuma, Toshio et al., "Detection and Global Optimization of Reduction Operations for Distributed Parallel Machines," Proceedings of the 10th International Conference on Supercomputing, 1996, pp. 18-25.*
Maydan, Dror E. et al., "Array Data-Flow Analysis and Its Use in Array Privatization," Proceedings of the 20th ACM SIGPLAN-SIGACT Symposium on Principles of Programming Languages, 1993, pp. 2-15.*
Li, Zhiyuan, "Array Privatization for Parallel Execution of Loops," Proceedings of the 6th International Conference on Supercomputing, 1992, pp. 313-322.*
Rauchwerger, Lawrence; Padua, David A.; "LRPD Test: Speculative Run-Time Parallelization of Loops with Privatization and Reduction Parallelization." IEEE Transactions on Parallel and Distributed Systems, vol. 10, No. 2, Feb. 1999, pp. 160-180.
Gutierrez, E.; Plata, O.; Zapata, E. L.; "A Compiler Method for the Parallel Execution of Irregular Reductions in Scalable Shared Memory Multiprocessors." Proceedings of the International Conference on Supercomputing, 2000, pp. 78-87.

* cited by examiner

*Primary Examiner* — Michael J Yigdall
(74) *Attorney, Agent, or Firm* — Cantor Colburn LLP; Libby Toub

(57) ABSTRACT

A method for providing parallel processing capabilities including: performing scalar and array privatization analysis via a compiler; checking whether an assignment statement is reducible; recognizing reduction patterns through a pattern matching algorithm; classifying a reduction type of each of the reduction patterns; and performing transformations and code generation for each reduction the reduction type of each of the reduction patterns.

10 Claims, 5 Drawing Sheets

```
Mvalue_thread_number = -INF
Mindex_i@thread_number = 0
Mindex_j@thread_number = 0
Do I = 1, N
    Do J = 1,M
        If (Mvalue_thread_number .LT. A(I, J) ) then
            Mvalue_thread_number = A(I, J)
            Mindex_i@thread_number = I
            Mindex_j@thread_number = J
        Endif
    Enddo
Enddo
Mvalue[thread_number] = Mvalue_thread_number
Mindex_i[thread_number] = Mindex_i@thread_number
Mindex_j[thread_number] = Mindex_j@thread_number
```

```
        Max_value = A(1,1)
        Do I = 1, N
            Do J = 1, M
S1:             If ( Max_value .LT. A(I, J) ) then
S2:                 Max_value = A(I, J)
S3:                 Max_index_i = I
S4:                 Max_index_j = J
                Endif
            Enddo
        Enddo
```

FIG. 2

```
           Num = 0
           Do I = 1, N
                   Do J = 1, M
S1:                        If ( A(I, J) .EQ. val ) then
S2:                                Num = Num + 1
                           Endif
                   Enddo
           Enddo
```

FIG. 3

```
Mvalue_thread_number = -INF
Mindex_i@thread_number = 0
Mindex_j@thread_number = 0
Do I = 1, N
        Do J = 1,M
                If (Mvalue_thread_number .LT. A(I, J) ) then
                        Mvalue_thread_number = A(I, J)
                        Mindex_i@thread_number = I
                        Mindex_j@thread_number = J
                Endif
        Enddo
Enddo
Mvalue[thread_number] = Mvalue_thread_number
Mindex_i[thread_number] = Mindex_i@thread_number
Mindex_j[thread_number] = Mindex_j@thread_number
```

FIG. 4

```
Max_value = -INF
Max_index_i = 0
Max_index_j = 0
Do thread_number = 1, total_thread_number
    If ( Max_value .LT. Mvalue[thread_number] ) then
        Max_value = Mvalue_[thread_number]
        Max_index_i = Mindex_i[thread_number]
        Max_index_j = Mindex_j[thread_number]
    Endif
Enddo
```

FIG. 5

FRAMEWORK FOR PARALLELIZING GENERAL REDUCTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to reductions of array variables, and particularly to a method for solving a general reduction problem, which is generalized as a divide-and-conquer problem for solving a problem on an instance of size n, by dividing the instance into two or more smaller instances.

2. Description of Background

Most compilers are capable of recognizing simple reductions such as the accumulation into the variable "SUM" 10 in FIG. 1. Reductions of array variables are also common in scientific codes and are a potential source of significant improvements in parallelization results. In general, a reduction can be expressed in the form of $R=\{r, \otimes, f, d\}$, where r can be a scalar variable, an array, or a compound expression. The symbol, $\otimes$, represents an associative reduction operator, $f$ is a function of reduction execution, and d is a domain for reduction operation. Taking the code segment 10 in FIG. 1 as an example, r is a scalar variable, i.e., SUM, $\otimes$, is +, $f$ is an identity function, and d is the data area pointed by A ranging from A[1,1] to A[N,M].

Handling such kind of scalar reduction in FIG. 1 is straightforward. There are a number of solutions implemented or proposed. For example, a conventional method is to use a critical section to enable parallel execution of the loop. Another approach is to compute a partial reduction result of each processor and then merge the results to get the overall result. However, for a reduction that involves complicated structures, such as a conditional branch, the identification and implementation is difficult.

For instance, an example code segment 12 in FIG. 2 is considered, which is used to calculate a global maximum and indexes associated with the maximum value. The loop in FIG. 2 cannot be parallelized due to the loop carried dependences on Max_value, Max_index_i and Max_index_j. Another example of a code segment 14 is shown in FIG. 3, which is used to detect the number of array elements whose value is equal to that of variable val. Code segment 12 in FIG. 2 and code segment 14 in FIG. 3 illustrate the difficulty in identifying and implementing a general reduction.

Considering the limitations of the aforementioned methods, it is clear that there is a need for an efficient method for solving a general reduction problem, which is generalized as a divide-and-conquer problem for solving a problem on an instance of size n, by dividing the instance into two or more smaller instances.

SUMMARY OF THE INVENTION

The shortcomings of the prior art are overcome and additional advantages are provided through the provision of a method for providing parallel processing capabilities, the method comprising: performing scalar and array privatization analysis via a compiler; checking whether an assignment statement is reducible; recognizing reduction patterns through a pattern matching algorithm; classifying a reduction type of each of the reduction patterns; and performing transformations and code generation for each reduction the reduction type of each of the reduction patterns.

The shortcomings of the prior art are overcome and additional advantages are provided through the provision of a system for providing parallel processing capabilities, the system comprising: a network; and a host system in communication with the network, the host system including software to implement a method comprising: performing scalar and array privatization analysis via a compiler; checking whether an assignment statement is reducible; recognizing reduction patterns through a pattern matching algorithm; classifying a reduction type of each of the reduction patterns; and performing transformations and code generation for each reduction the reduction type of each of the reduction patterns.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient method for solving a general reduction problem, which is generalized as a divide-and-conquer problem for solving a problem on an instance of size n, by dividing the instance into two or more smaller instances.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates one example of a maxloc loop code segment;

FIG. 3 illustrates one example of a reduction loop code segment;

FIG. 4 illustrates one example of a code segment for partial summation according to the exemplary embodiments of the present invention; and FIG. 5 illustrates one example of a code segment summing up the partial result according to the exemplary embodiments of the present invention.

DETAILED DESCRIPTION OF THE INVENTION

Figure 1:
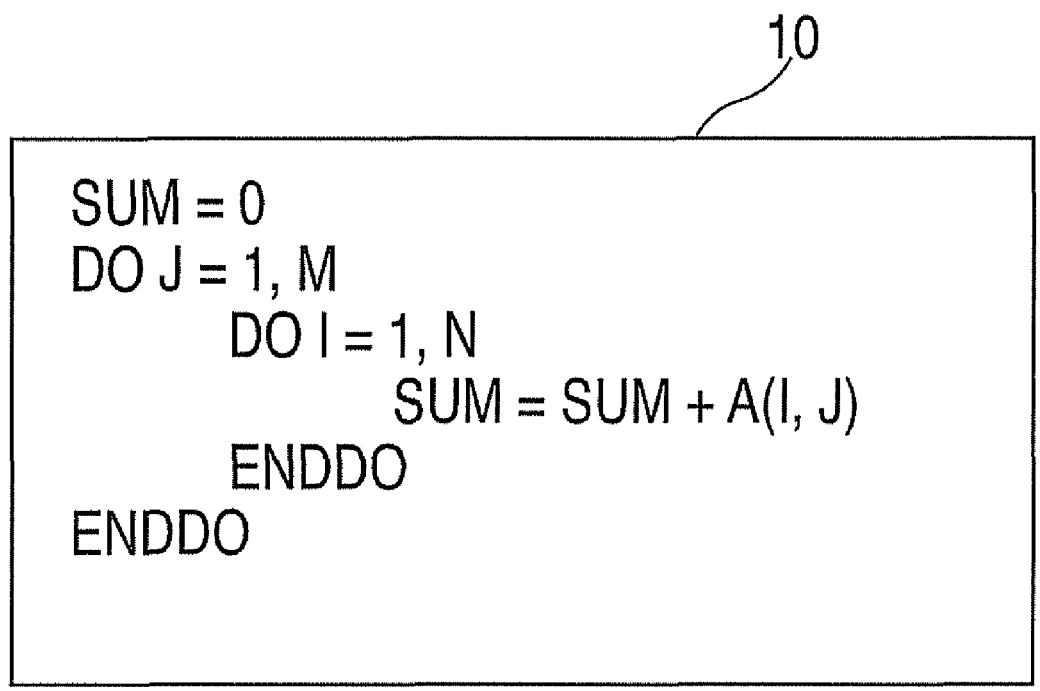
FIG. 1 illustrates one example of a reduction variable code segment.

One aspect of the exemplary embodiments is a method for solving a general reduction problem, which is generalized as a divide-and-conquer problem for solving a problem on an instance of size n, by dividing the instance into two or more smaller instances. In another exemplary embodiment, the outermost loop is parallelized, which results in a performance improvement on multi-processor systems.

The exemplary embodiments of the present invention present a framework to solve a general reduction problem, which is generalized as a divide-and-conquer problem. In particular, solving a problem on an instance of size n, by dividing it into two or more smaller instances. Each of these smaller instances is recursively solved, and the solutions are combined to produce a solution for the original instance. The exemplary embodiments consist of scalar and array privatization analysis, general reduction recognition and type classification, parallelization, and reduction coalescing and aggregation.

Concerning scalar and array privatization on analysis a compiler performs scalar and array privatization analysis. The compiler finds those scalar variables whose definitions and references are closed in a loop iteration. Furthermore a single array data-flow analysis is used to determine arrays involved in data dependences, to locate private arrays and to recognize reductions. Array data-flow analysis is a bottom-up inter-procedural analysis on the loops and procedures of the program, using the region-based analysis framework.

Concerning general reduction detection through pattern matching, the exemplary embodiments use a pattern matching algorithm to identify the MAXLOC/MINLOC reduction using the form of an "if structure". The absolute value operations are fully supported. The exemplary embodiments start from the innermost loop. Taking the code segment 12 in FIG. 2 as an example, since it satisfies the following conditions, it would be considered as a MAXLOC reduction. The conditions are as follows: (1) the loop body starts with an if statement, S1, (2) there are a total of three statements inside the if structure, which is one more than the dimension of the array, (3) there is a maximum value assignment, S2, the array element is exactly the same as that of the if statement, (4) for the location assignment, S3 and S4, the right side is the index of the array, and (5) after the reduction in the innermost loop is identified, propagation to the outer-most loop in accordance with the dimension of the array is performed.

Concerning the registering of the reduction, the reduction is added to the reduction list of the top-most nesting level. For extreme reductions, a reduction set may be required. Taking the code segment 12 in FIG. 2 as an example, the code segment 12 includes the variable Max_value, which is used to record the maximum value of the array A along with Max_index_i and Max_index_j to recall the position of the maximum value. For the convenience of code generation, the exemplary embodiments use two reduction types: MAXVAL/MINVAL, which is used for extreme values and MAXLOC/MINLOC, which is used for the location of the extreme values. The relationship of the set of reductions can be expressed as follows:

$$maxloc\begin{pmatrix} u_1, u_2, u_3, \ldots \\ i_1, i_2, i_3, \ldots \\ j_1, j_2, j_3, \ldots \\ \ldots \end{pmatrix} = \begin{pmatrix} w \\ k \\ l \\ \ldots \end{pmatrix}$$

in which u denotes the array element and i,j . . . denote the corresponding indices.

w=max($u_1$,$u_2$,$u_3$, . . . )
k=min($i_m$,$i_n$, . . . ) where ($u_m$=$u_n$= . . . =w)
l=min($j_m$,$j_n$, . . . ) where ($u_m$=$u_n$= . . . =w)

In case the two elements are equal, the index is kept unchanged, which is compatible with sequential logic.

Concerning parallel reduction code generation, a parallelizer generates three steps for each reduction variable in the reduction list of the loop: initialization, partitioning of the code among processors for partial sum, and finally sum up each partial sum result. In addition, the code segment 12 of FIG. 2 illustrates the code generation for each step generated by the parallelizer.

FIG. 3 illustrates the code segment 14 for initialization. In FIG. 3, the parallelizer initializes an extreme value as a negative infinity and initializes its corresponding index with 0.

FIG. 4 illustrates the code segment 16 for partial summation of each processor in accordance with the exemplary embodiments of the present invention. In this phase, the sequential code is cloned and each reduction variable is assigned an array to hold its partial result and the index of the array is the number of this thread.

Finally, in the exemplary embodiments, the partial results are collected and summed up together by the master thread. The code segment 18 for summing up the partial results is shown in FIG. 5. FIG. 5 illustrates that the value of BUMP is always positive within the IF branch. Hence, during copy propagation pass, the code can copy the value of BUMP inside the IF branch without the max operator. Also, the loop dependency in the induction variable is eliminated through the adding and removal of the max operator to the unknown loop count within the nested loops.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for providing parallel processing capabilities, the method comprising:
    performing scalar privatization analysis on a software code including code segments via a compiler;
    performing array privatization analysis on the software code via the compiler, the array privatization analysis including determining which arrays are private;
    recognizing a code segment as including a reducible assignment as a maximum or minimum reduction pattern for the assignment of a maximum or minimum value through a pattern matching algorithm, recognizing including:
        determining that the code segment includes a loop that starts with an if statement;
        determining that the segment includes at least one more assignment statement than an array being operated on by the code segment;
        determining that the code segment includes either a maximum value assignment or a minimum value assignment for a variable of the if statement;
    classifying the code segment as being a maximum value reduction in the event that the code segment includes the maximum value assignment and classifying the code segment as being a minimum value reduction in the event that the code segment includes the minimum value assignment; and performing transformations and code generation for the maximum or minimum value value reduction.

2. The method of claim 1, wherein the transformations and code generation involves initializations and distributing code among one or more threads.

3. The method of claim 1, wherein the scalar and array privatization analysis involves solving a problem on an original instance of size n by dividing the original instance into two or more smaller instances.

4. The method of claim 3, wherein the two or more smaller instances are each recursively solved, a solution of each of the two or more smaller instances being combined to produce an overall solution for the original instance.

5. The method of claim 1, further comprising the step of performing array data-flow analysis for determining arrays involved in data dependences.

6. A system for providing parallel processing capabilities, the system comprising:
   a network; and
   a host system in communication with the network, the host system including software to implement a method comprising:
     performing scalar privatization analysis on a software code including code segments via a compiler;
     performing array privatization analysis on the software code via the compiler, the array privatization analysis including determining which arrays are private;
     recognizing a code segment as including a reducible assignment as a maximum or minimum reduction patterns for the assignment of a maximum or minimum value through a pattern matching algorithm, recognizing including:
       determining that the code segment includes a loop that starts with an if statement;
       determining that the segment includes at least one more assignment statement than an array being operated on by the code segment;
       determining that the code segment includes either a maximum value assignment or a minimum value assignment for a variable of the if statement;
     classifying the code segment as being a maximum value reduction in the event that the code segment includes the maximum value assignment and classifying the code segment as being a minimum value reduction in the event that the code segment includes the minimum value assignment; and
   performing transformations and code generation for the maximum or minimum value value reduction.

7. The system of claim 6, wherein the transformations and code generation involves initializations and distributing code among one or more threads.

8. The system of claim 6, wherein the scalar and array privatization analysis involves solving a problem on an original instance of size n by dividing the original instance into two or more smaller instances.

9. The system of claim 8, wherein the two or more smaller instances are each recursively solved, a solution of each of the two or more smaller instances being combined to produce an overall solution for the original instance.

10. The system of claim 6, further comprising the step of performing array data-flow analysis for determining arrays involved in data dependences.

* * * * *